United States Patent [19]
Kahaner

[11] 4,083,738
[45] Apr. 11, 1978

[54] METHOD AND APPARATUS FOR SPLICING TIRE CORD FABRIC

[75] Inventor: Joel M. Kahaner, Akron, Ohio

[73] Assignee: The Goodyear Tire & Rubber Company, Akron, Ohio

[21] Appl. No.: 772,800

[22] Filed: Feb. 25, 1977

Related U.S. Application Data

[62] Division of Ser. No. 398,053, Sep. 17, 1973, Pat. No. 4,030,653.

[51] Int. Cl.² .............................................. B32B 7/08
[52] U.S. Cl. ................................... 156/92; 29/432.1; 140/93.2; 156/134
[58] Field of Search ............... 156/92, 134; 29/200 A, 29/235, 241, 432.1; 140/93.2; 227/65

[56] References Cited

U.S. PATENT DOCUMENTS

| | | | |
|---|---|---|---|
| 1,353,456 | 9/1920 | Coryell | 29/241 |
| 2,754,887 | 7/1956 | Wykoff | 156/134 |
| 3,149,658 | 9/1964 | Wolfe | 156/95 |
| 3,925,129 | 12/1975 | Blankenship | 156/96 |

Primary Examiner—Edward G. Whitby
Attorney, Agent, or Firm—R. S. Washburn

[57] ABSTRACT

A method and apparatus for splicing two rolls of tire cord fabric in axially aligned relation. A plurality of splicing rods are forced through overlapped ends of the rolls from opposing longitudinal sides of the fabric. The splicing rods are guided through the overlapped ends at successive points spaced along parallel lines angularly disposed to the parallel warp cords of the fabric and alternately pierce and pass through the pieces of fabric from the farthest spaced faces of the overlapped ends. The splicing rods are firmly snubbed together and held in position by the coaction of the warp cords and weft threads of the fabric, as the fabric is tensioned.

11 Claims, 8 Drawing Figures

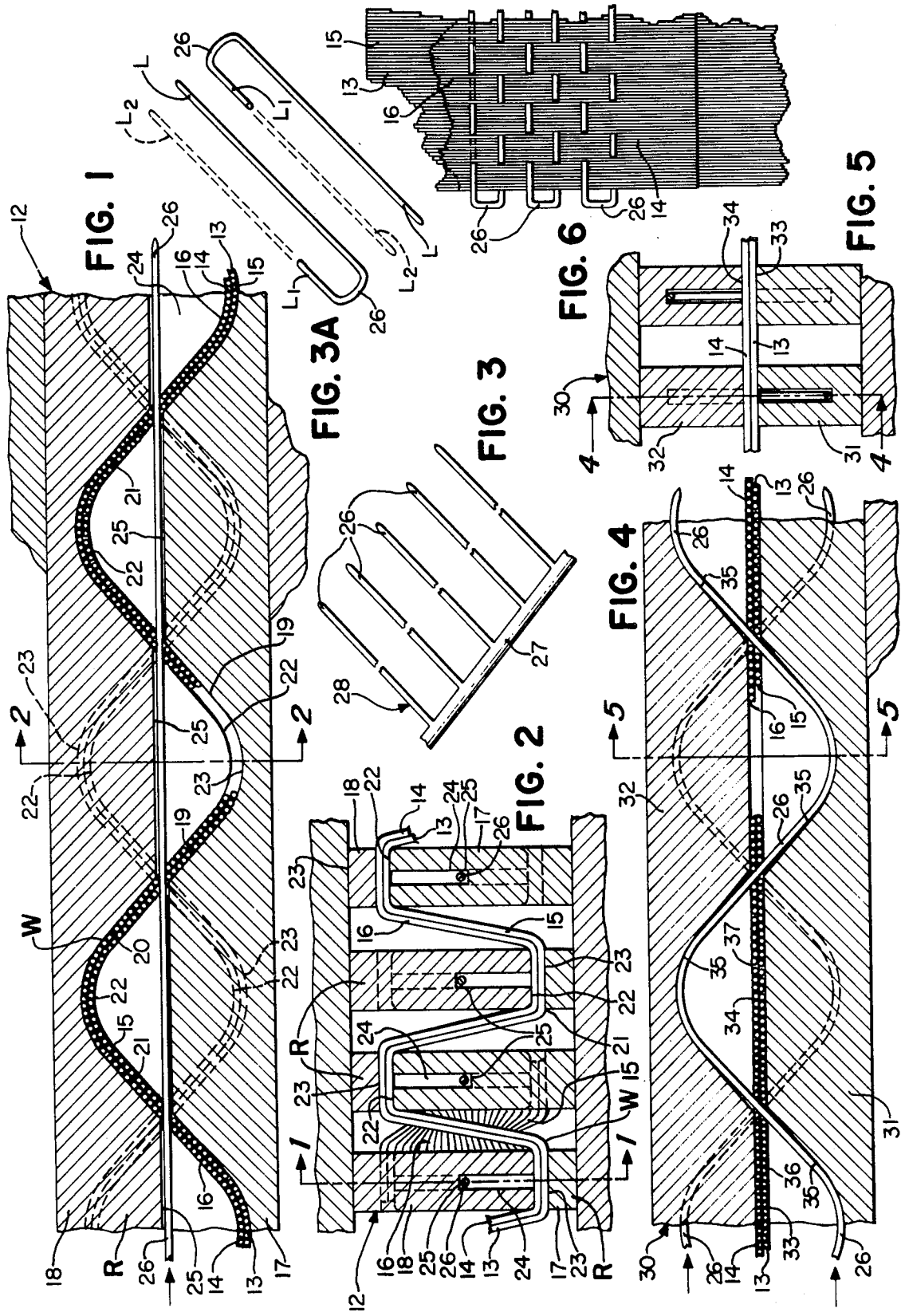

METHOD AND APPARATUS FOR SPLICING TIRE CORD FABRIC

This is a division of application Ser. No. 398,053 filed Sept. 17, 1973 now U.S. Pat. No. 4,030,653.

BACKGROUND OF THE INVENTION

The invention is particularly well suited for splicing adjacent ends of successive rolls of tire cord fabric to form a continuous sheet of fabric for uninterrupted processing at relatively high speeds. The fabric could be processed at higher speeds if it were not for the delays caused in joining and disjoining the individual rolls of fabric before and after the treatment of the fabric in the rolls. These delays are presently compensated for by moving the fabric into storage accumulators, before and after processing, where an excess of fabric is stored to provide continuity of the process while the rolls are being fastened together and separated from each other. Sewing machines are generally used for splicing the overlapped trailing end of the fabric being processed and the leading end of the fabric about to be processed. It takes considerable time stitching the overlapped ends together, and occasionally the sewing needles break during the stitching operation causing even greater delays which must be compensated for if the process is to continue smoothly without a shutdown. Moreover, sewing machines are complex pieces of equipment requiring constant maintenance to keep them in good working condition and free of breakdowns caused by a malfunction of one of the many moving parts of the machine. The invention is directed to making an improved splice which saves time and some material which is usually ruined and must be discarded.

Briefly stated, the invention is in a method and apparatus for axially joining two pieces of fabric composed of warp cords which are held in parallel array by weft threads. The apparatus comprises a clamp for holding the adjacent ends of the two pieces of fabric in overlapped relation, the warp cords of the overlapped ends being generally parallel. Means are provided for guiding a plurality of splicing rods into piercing engagement with the overlapped ends at points spaced along parallel lines angularly disposed to the parallel warp cords, the rods passing through the overlapped ends alternately from the opposing farthest spaced faces of the overlapped ends.

DESCRIPTION OF THE DRAWING

The following description of the invention will be better understood by having reference to the annexed drawing, wherein:

FIG. 1 is a section of a portion of an apparatus made in accordance with the invention, as viewed from the line 1—1 of FIG. 2;

FIG. 2 is a section of the apparatus viewed from the line 2—2 of FIG. 1;

FIGS. 3–3A are perspective views of different splicing rods used for joining the pieces of fabric;

FIG. 4 is a section of another embodiment of the invention as viewed from the line 4—4 of FIG. 5;

FIG. 5 is a section viewed from the line 5—5 of FIG. 4; and

FIG. 6 is a plan view of a section of two pieces of fabric spliced together in accordance with the invention.

DESCRIPTION OF THE INVENTION

Figure 7:
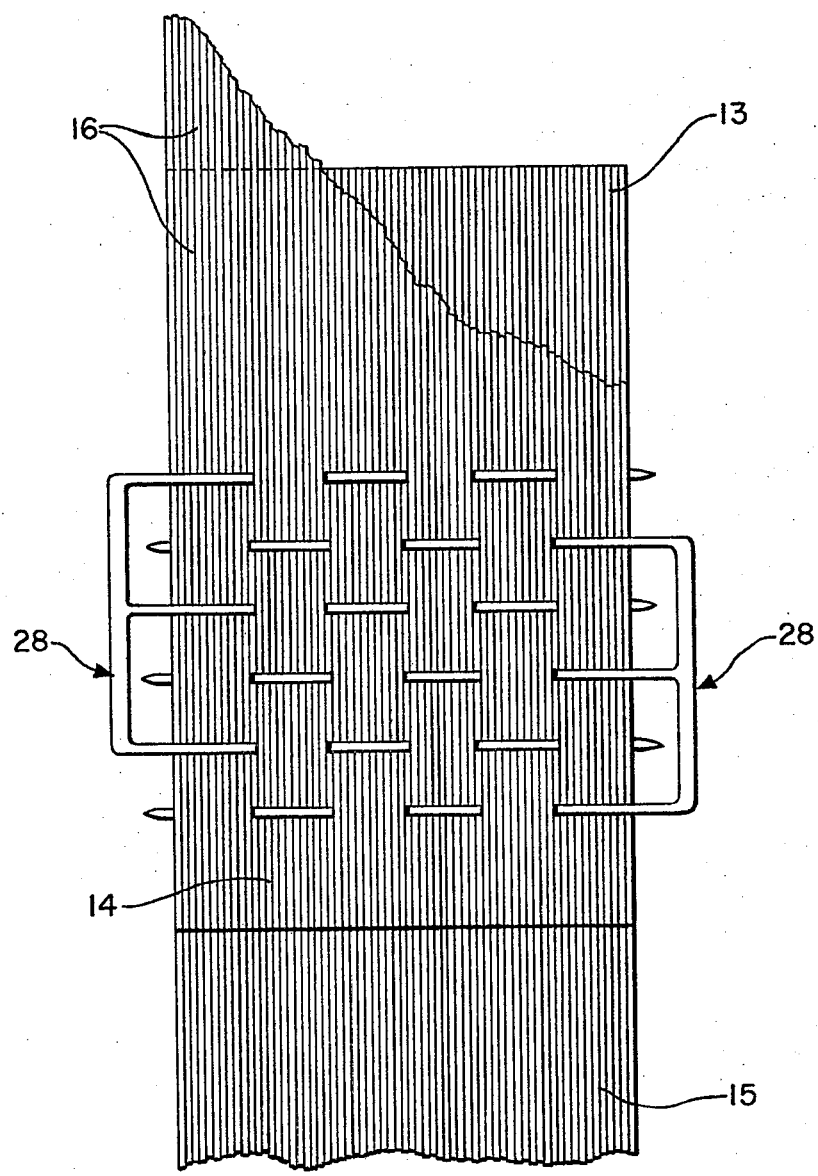
FIG. 7 is a plan view of a section of two pieces of fabric spliced together with the splicing rods of FIG. 3.

Referring specifically to FIGS. 1–2 of the drawing, there is shown a clamping apparatus 12 used in splicing together, or axially joining adjacent overlapped ends 13 and 14 of two pieces 15 and 16 of plain woven tire cord fabric composed of warp cords which are held in parallel array by weft threads. The two pieces 15, 16 of fabric are fastened together such that the warp cords are generally parallel.

The splicing apparatus or clamp 12 comprises two clamp sections 17 and 18 with matingly configured inner peripheries 18 and 20 having parallel rows R of waves 21, the longitudinal axis of each row R being parallel to the longitudinal axis of the splicing apparatus 12. The waves 21 of each row R are formed by interconnected curved peaks, or ridges 22 and curved valleys, or troughs 23. The ridges 22 and troughs 23 of alternate rows R of waves 21 are laterally aligned relative to the longitudinal axis of the splicing apparatus 12, and the ridges 22 of one row R are similarly laterally aligned with the troughs 23 of the next adjacent rows R. Although less desirable, the waves may have a pointed or blunted saw-toothed configuration, that is formed by interconnected V or U-shaped valleys and inverted V or U-shaped peaks. The overall length of the two sections 17 and 18, measured along the longitudinal axis of the splicing apparatus 12, is at least equal to the overall width of the juxtaposed pieces 15 and 16 of fabric being joined.

The two sections 17 and 18 of the splicing apparatus 12 are clamped firmly together across the overlapped ends 13 and 14 of fabric to form a series of waves W both longitudinal of, and transversely across the overlapped pieces 15 and 16 of fabric. The splicing apparatus 12 is positioned such that its longitudinal axis is normal or at right angles to the generally parallel warp cords of the juxtaposed pieces 15 and 16 of fabric.

The rows R of waves 21 formed in each of the two sections 17 and 18 of the apparatus 12 are each provided with axially aligned, spaced pin receiving slot segments 24, the slot segments 24 of matingly configured waves 21 of each row R being in axial alignment when the sections 17 and 18 are clamped together with the overlapped ends 13 and 14 of fabric. The aligned slot segments 24 form a plurality of longitudinally extending, parallel pin receiving slots 25, which are in the same plane and designed to intersect the waves 21 of the apparatus 12 and correspondingly configured waves W of overlapped fabric, preferably midway between the ridges 22 and troughs 23. The slots 25 extend through the ridges 22 and have a rectangular cross-section as best seen in FIG. 2. The slots 25 are each designed to receive a splicing rod or pin 26 which is moved along a straight line pathway through the waves W of fabric. As previously indicated, the waves W of fabric formed along the pathways that adjacent splicing rods 26 travel, are deliberately not in phase such that adjacently disposed rods 26 pierce the waves W of fabric between different warp cords of the fabric.

The individual splicing rods 26 are composed of any suitable material, e.g. metal or plastic. In some cases, the splicing rods 26 may be cabled cords which are stronger and heavier in diameter than the warp cords of the fabric. Such cords, for example, can comprise a number of strands of nylon or polyester twisted together. An elongated needle is used to guide such flexible cords through the waves W of fabric. Two pieces of fabric were successfully spliced together using a plurality of ⅛-inch diameter steel rods 26 (FIG. 6). It was discovered that the fabric would split and the warp cords ball up at the longitudinal edges or sides, unless restrained in some way. This was accomplished and the problem solved, by using U-shaped splicing rods 26 (FIG. 3A) having unequal legs L and $L_1$ or equal legs L and $L_2$. A plurality of splicing rods 26 can be connected at one end by a bridge 27 to resemble a comb 28 with outstanding parallel teeth which are at right angles to the longitudinal axis of the bridge 27. The splicing rods 26 are sufficiently rigid and pointed to be forced through the waves W of fabric formed by the sections 17 and 18. A plurality of U-shaped splicing rods 26, or combs 28 (FIG. 7), are forced into the waves W of tire cord fabric from opposing longitudinal sides or edges of the overlapped fabric ends 13 and 14. It can be visualized that the rods or teeth 26 of the two combs 28 will pass through alternate slots 25 in the splicing apparatus 12. The splicing rods 26 of each comb 28 are thus guided simultaneously through the individual waves W midway between the interconnected ridges 22 and troughs 23. The splicing apparatus 12 is removed from the superimposed pieces 15, 16 of fabric after the combs 28 are in position where the bodies or bridges 26 of the combs 28 are adjacent the longitudinal sides of the overlapped ends 13 and 14 of fabric. The number of splicing rods 26 required to form a good splice depends largely on the tension to which the fabric is subjected during subsequent processing.

Another embodiment of the invention is illustrated in FIGS. 4 and 5 and shows a splicing apparatus or clamp 30 comprised of two clamp sections 31 and 32 having matingly configured inner surfaces or peripheries 33 and 34 which are flat, such that they hold the overlapped ends 13 and 14 of fabric in parallel, planar relation. The sections 31 and 32 are also provided with a series of slot segments 35 which define sinuous pathways extending longitudinally of the splicing apparatus 30, when the sections 31 and 32 are clamped together with the overlapped ends 13 and 14 of fabric. The sinuous pathways of adjacent splicing rods 26 are also out of phase, such that successive rods 26 pierce the flattened fabric between different warp cords. Metal rods 26 or combs similar to those shown in FIGS. 3 and 3A are then pushed through the sinuous slots 35 which are designed to alternately direct the splicing rods 26 through the overlapped ends 13 and 14 from the farthest opposing faces 36 and 37 of the flattened, juxtaposed pieces 15 and 16 of fabric.

It can be appreciated that the splicing apparatus 30 of FIGS. 4 and 5 maintains the overlapped ends 13 and 14 of fabric in superimposed, parallel planar relation while deflecting the splicing rods 26 sinuously through the fabric, whereas the splicing apparatus 12 of FIGS. 1 and 2 is designed to maintain the overlapped ends 13 and 14 in waves or sinuous, superimposed relation while directing the splicing rods 26 along straight line pathways through the waves W midway between the interconnected ridges 22 and troughs 23.

The overlapped pieces of fabric include a conventional tabby woven in each of the overlapped ends 13 and 14 of fabric. The splicing rods 26 are preferably passed through the overlapped tabbies at the ends of the fabric. The splicing rods 26 can also be passed through the overlapped ends 13 and 14 of fabric between the tabbies when the overlapped is such that the tabbies at the ends of the fabric are spaced apart. In such cases, the tabbies act as abutments against which the splicing rods 26 are snubbed. After the splice is completed and the splicing apparatus removed, the tension in the fabric causes the waves W of fabric or wavy splicing rods 26 to flatten. The warp cords and weft threads of the spliced fabric coact to snub the splicing rods 26 firmly in position where their longitudinal axes are generally normal to the parallel warp cords of the fabric. The splicing rods 26 are, at present, manually placed in the slots 25 and forced to pierce and pass through the overlapped ends 13 and 14 of fabric along either of the pathways shown in FIGS. 1 and 4. However, any suitable mechanism could be used in conjunction with the splicing apparatus for automatically positioning and seating the rods 26 in splicing engagement with the pieces of fabric.

Thus, there has been described a method and apparatus for making an improved splice of two rolls or pieces of tire cord fabric. The splicing rods 26 can be quickly moved through the overlapped ends of tire cord fabric saving valuable time. In the past, the width of the fabric always narrowed at the splice when the fabric was placed under tension, resulting in a loss of this particular distorted portion of fabric. It was discovered that the use of splicing rods eliminated, or substantially reduced this problem resulting in less fabric being wasted or discarded.

What is claimed is:

1. A method of splicing at least two pieces of fabric composed of warp cords held in parallel array by weft threads, comprising the steps of:
    (a) holding adjacent ends of the two pieces of fabric in overlapped relation, the warp cords of the overlapped ends being generally parallel;
    (b) forming waves with interconnected ridges and troughs across the overlapped ends such that the longitudinal axes of the ridges and troughs parallel the warp cords; and
    (c) moving a plurality of splicing rods across the overlapped ends while guiding the rods into piercing engagement through the waves intermediate the ridges and troughs at successive points spaced along parallel lines angularly disposed to the parallel warp cords and through the overlapped ends alternately from the opposing farthest spaced faces of the overlapped ends.

2. The method of claim 1, wherein the rods pierce the waves midway between the ridges and troughs.

3. A method of splicing at least two pieces of fabric composed of warp cords held in parallel array by weft threads, comprising the steps of:
    (a) holding adjacent ends of the two pieces of fabric in overlapped relation, the warp cords of the overlapped ends being generally parallel;
    (b) forming waves with interconnected ridges and troughs across the overlapped ends such that the longitudinal axes of the ridges and troughs parallel the warp cords;
    (c) Moving a plurality of splicing rods across the overlapped ends while guiding the rods into piercing engagement through the waves midway between the ridges and troughs at successive points spaced along parallel lines angularly disposed to the parallel warp cords and through the overlapped ends alternately from the opposing farthest spaced faces of the overlapped ends; and (d) said rods being interconnected at one end forming a comb with outstanding teeth for piercing the waves.

4. The method of claim 3, wherein a pair of combs are pushed through the overlapped ends from opposing longitudinal sides of the ends.

5. The method of claim 4, wherein the rods are non-metallic.

6. The method of claim 4, wherein the rods are metallic.

7. A method of splicing at least two pieces of fabric composed of warp cords held in parallel array by weft threads, comprising the steps of:
(a) holding adjacent ends of the two pieces of fabric in overlapped relation, the warp cords of the overlapped ends being generally parallel;
(b) maintaining the overlapped ends in parallel, planar relation; and
(c) moving a plurality of splicing rods across the overlapped ends while guiding the rods sinuously into piercing engagement with the overlapped ends at successive points spaced along parallel lines angularly disposed to the parallel warp cords and through the overlapped ends alternately from the opposing farthest spaced faces of the overlapped ends.

8. The method of claim 7, wherein the rods are interconnected at one end forming a comb with outstanding teeth for piercing the waves.

9. The method of claim 8, wherein a pair of combs are pushed through the overlapped ends from opposing longitudinal sides of the ends.

10. The method of claim 9, wherein the rods are non-metallic.

11. The method of claim 9, wherein the rods are metallic.

* * * * *